(12) United States Patent
Ji

(10) Patent No.: US 12,119,733 B2
(45) Date of Patent: Oct. 15, 2024

(54) MOTOR AND SPLIT FAN

(71) Applicant: JWORD (FOSHAN) SCIENCE AND TECHNOLOGY CO., LTD., Guangdong (CN)

(72) Inventor: Dashan Ji, Guangdong (CN)

(73) Assignee: JWORD (FOSHAN) SCIENCE AND TECHNOLOGY CO., LTD., Guangdong (CN)

( * ) Notice: Subject to any disclaimer, the term of this patent is extended or adjusted under 35 U.S.C. 154(b) by 252 days.

(21) Appl. No.: 17/790,802

(22) PCT Filed: Dec. 24, 2020

(86) PCT No.: PCT/CN2020/138819
§ 371 (c)(1),
(2) Date: Jul. 5, 2022

(87) PCT Pub. No.: WO2021/139532
PCT Pub. Date: Jul. 15, 2021

(65) Prior Publication Data
US 2023/0006512 A1 Jan. 5, 2023

(30) Foreign Application Priority Data

Jan. 10, 2020 (CN) .......................... 202020055626.3
Jan. 10, 2020 (CN) .......................... 202020057133.3
Jan. 10, 2020 (CN) .......................... 202020058926.7

(51) Int. Cl.
*H02K 9/06* (2006.01)
*H02K 5/20* (2006.01)
*H02K 7/08* (2006.01)

(52) U.S. Cl.
CPC .............. *H02K 9/06* (2013.01); *H02K 5/207* (2021.01); *H02K 7/08* (2013.01)

(58) Field of Classification Search
CPC ............ F04D 29/5806; F04D 25/0606; F04D 25/082; F04D 19/002; F04D 29/545;
(Continued)

(56) References Cited

U.S. PATENT DOCUMENTS 10,389,186 B2    8/2019  Tang et al.
10,916,990 B2 *  2/2021  Hwang ................... H02K 5/161
(Continued)

FOREIGN PATENT DOCUMENTS

CN    204465228 U    7/2015
CN    108199553    *  6/2018  ............. H02K 21/14
(Continued)

OTHER PUBLICATIONS

PCT Patentability Report, PCT/CN2020/138819 (English).*

*Primary Examiner* — Burton S Mullins
(74) *Attorney, Agent, or Firm* — Best & Flanagan LLP

(57) ABSTRACT

A motor, comprising casing, rotating shaft, magnetic ring, three-phase hollow cup coil winding and insulating end cover, is provided. The casing comprises sleeve and inner core arranged coaxially with sleeve and air guide plates connected to sleeve and inner core, the sleeve, inner core and two adjacent air guide plates are surrounded to form air guide channel, inner core is provided with mounting hole, bearing is installed in mounting hole, and rotating shaft passes through bearing, magnetic ring is sleeved outside one end of rotating shaft, three-phase hollow cup coil winding is sleeved outside the magnetic ring. Rotating gap is set between three-phase hollow cup coil winding and magnetic ring, and insulating end cover is installed on the outlet of sleeve. Wind end fixes the three-phase hollow cup coil winding in sleeve, inner core is provided with heat dissipation holes that are all connected with mounting holes.

18 Claims, 8 Drawing Sheets

(58) Field of Classification Search
CPC ........ F04D 29/52; H02K 5/207; H02K 5/163;
H02K 21/16; H02K 7/08; H02K 3/24;
H02K 7/14; H02K 9/06; H02K 1/20
USPC ..... 417/423.1, 423.7, 423.8, 423.11, 423.12,
417/423.14
See application file for complete search history.

(56) References Cited

U.S. PATENT DOCUMENTS

| | | | | |
|---|---|---|---|---|
| 11,261,881 B2* | 3/2022 | Hwang | ................. | F04D 29/667 |
| 11,864,713 B2* | 1/2024 | Jung | ........................ | H02K 9/06 |
| 2017/0170709 A1* | 6/2017 | Barnes | ................. | H02K 21/185 |
| 2021/0344249 A1* | 11/2021 | Kim | ........................ | H02K 21/16 |

FOREIGN PATENT DOCUMENTS

| | | | | | |
|---|---|---|---|---|---|
| CN | 108233655 | A | 6/2018 | | |
| CN | 110043491 | * | 7/2019 | ............. | F04D 29/54 |
| CN | 110043491 | A | 7/2019 | | |
| CN | 110529405 | A | 12/2019 | | |
| CN | 210397172 | * | 4/2020 | ........... | F04D 29/064 |
| CN | 211239598 | U | 8/2020 | | |
| CN | 211573832 | U | 9/2020 | | |
| CN | 211573833 | U | 9/2020 | | |
| CN | 212660018 | U | 3/2021 | | |

* cited by examiner

MOTOR AND SPLIT FAN

FIELD

The present invention relates to the technical field of motors and fans, in particular to a motor and a split-type fan.

BACKGROUND

At present, with the continuous development of the motor industry in recent years, motor manufacturers continue to pursue small size and high power density. More and more materials with high electromagnetic load and thermal load are used in motor design, and the loss generated during motor operation increases, resulting in the overall temperature rise of the motor is too high or the local temperature rise is too high, it will not only reduce the service life of the motor, but also affect the efficiency, torque and other economic and technical indicators of the motor. The motor is the core component of the fan, and the performance of the fan depends on the performance of the motor. The existing fan has poor heat dissipation effect, short service life and poor concentricity. Therefore, the defects are very obvious, and there is an urgent need to provide a solution.

SUMMARY OF THE DISCLOSURE

In order to solve the above technical problems, the purpose of this present invention is to provide a motor and a split fan with good heat dissipation effect, long service life, and convenient disassembly, assembly and maintenance.

In order to achieve the above purpose, the present invention adopts the following technical solutions:

A motor, characterizing in that it comprises a casing, a rotating shaft, a magnetic ring, a three-phase hollow cup coil winding and an insulating end cover, the casing comprises a sleeve, an air inlet end arranged on the sleeve and coaxially arranged with the sleeve, the inner core and a plurality of air guide plates connected between the inner wall of the sleeve and the outer wall of the inner core, the plurality of air guide plates are arranged in an annular array around the central axis of the inner core, the inner wall of the sleeve, the outer wall of the inner core and the two adjacent air guide plates are surrounded by an air guide channel, the middle of the inner core is recessed with a mounting hole, and a bearing is installed in the mounting hole, the rotating shaft is installed on the inner ring of the bearing and penetrates the bearing, the magnetic ring is sleeved on the rotating shaft outside one end of the magnetic ring, the magnetic ring is located in the sleeve, the three-phase hollow cup coil winding is sleeved outside the magnetic ring, a rotating gap is set between the inner wall of the three-phase hollow cup coil winding and the outer wall of the magnetic ring, and the insulating end cover is detachable, it is installed at the air outlet end of the sleeve and used to fix the three-phase hollow cup coil winding in the sleeve, the inner core is provided with a plurality of heat dissipation holes, and the plurality of heat dissipation holes are arranged in an annular array around the central axis of the inner core, around the mounting hole and communicate with the mounting hole.

Preferably, the number of the installation holes is two, and the two installation holes are respectively formed by concave inwards from both ends of the inner core, and a limit protrusion for abutting the bearing is arranged between the two installation holes.

Preferably, the casing is a metal casing or a plastic casing.

Preferably, the motor also includes an insulating member arranged between the inner wall of the three-phase hollow cup coil winding and the outer wall of the magnetic ring, one end of the insulating member touches the other side of the inner core, and the other end of the insulating member touches the three-phase hollow cup coil winding.

Preferably, the inner end face of the inner core is concavely provided with a positioning cavity communicating with the installation hole, and one end of the insulating member is inserted into the positioning cavity.

Preferably, the insulating member includes a collar and a plurality of positioning plates arranged in the circumferential direction of the collar, one end of the collar is inserted into the installation hole, and one side of the plurality of positioning plates is inserted into the positioning cavity, there is a space between one end of the ring and the other end of the collar, and the other sides of the plurality of positioning plates all contact one end of the three-phase hollow cup coil winding.

Preferably, the inner end face of the inner core is concavely provided with an insertion hole, and one end of the collet away from the end ring is provided with a plug-in inserted in the insertion hole.

Preferably, the inner side of the limit block is protruded with a limit piece arranged opposite to a collet, one side of the limit piece, the limit block and the collet are surrounded by a limit slot, and the three-phase hollow cup coil winding has a limit groove, the other end is inserted into the limit slot, and there is a space between the other side of the limit piece and the outer side wall of the magnetic ring.

Preferably, a second bearing is arranged between the limit pieces of the plurality of limit blocks, and one end of the rotating shaft penetrates the magnetic ring and is inserted into the inner ring of the second bearing.

Preferably, the middle part of the sleeve is provided with a snap hole, and one end of the snap claw away from the end ring is provided with a snap block that snaps into the snap hole.

Preferably, the air outlet end of the sleeve is provided with a positioning groove, and one end of the claws close to the end ring is provided with a positioning block inserted in the positioning groove.

Preferably, the inner side of the inner core is extended with a plurality of arc convex pieces, and the plurality of circular arc convex pieces are arranged around the installation hole in a circular array around the central axis of the inner core, and one end of the three-phase hollow cup coil winding is sleeved outside multiple arc tabs.

Preferably, the wind deflector is in the shape of an involute arc.

The present invention also provides a split type fan, comprising a fan blade and the above-mentioned motor, the fan blade is sleeved outside the end of the rotating shaft of the motor away from the magnetic ring, the fan blade is located in the air inlet end of the sleeve and is arranged on the inner core outside.

The beneficial effects of the utility model: during actual operation, part of the airflow generated by the rotation of the fan blades passes through a plurality of heat dissipation holes and installation holes to the internal parts of the motor (such as: rotating shaft, bearing, magnetic ring and three-phase hollow cup coil winding, etc.) to dissipate heat, and another part of the air flow is blown out through multiple air guide channels. During the process of blowing the air out of the sleeve, the air flow will not only blow out of the sleeve directly, but also diffuse into the rotating gap and blow out through the rotating gap, which is more conducive to the magnetic ring and the three-phase hollow cup coil winding dissipate heat, and the heat dissipation effect is good, which prolongs the service life of the motor, and the motor adopts a split structure, which is convenient for disassembly and maintenance of the motor; the inner wall of the installation hole limits the bearing. In order to ensure the stability of the bearing, the rotating shaft runs through two bearings, so that the two ends of the rotating shaft are cantilevered, and the rotating shaft is supported by the bearings, which can well ensure the concentricity of the rotating shaft, the inner core and the sleeve, and improve the Stability and efficiency of shaft rotation. The motor and the split-type fan of the present invention have compact structure, good heat dissipation effect, convenient disassembly, assembly and maintenance, good expansibility, good concentricity between the rotating shaft and the sleeve and the inner core, stable rotation, small gas flow resistance, and air output. Large, high motor efficiency and long service life.

DESCRIPTION OF REFERENCE NUMBERS

Figure 1:
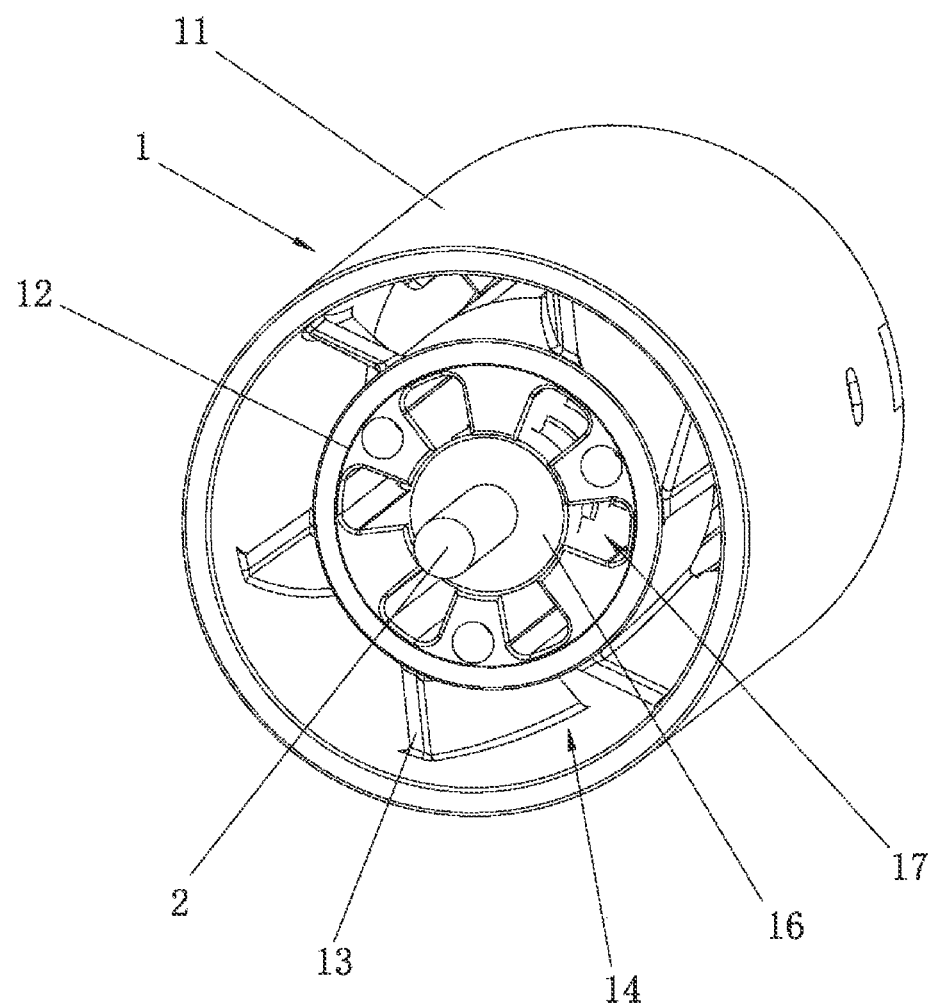
FIG. 1 is a schematic three-dimensional structure diagram of a motor according to a first embodiment of the present invention.
Figure 2:
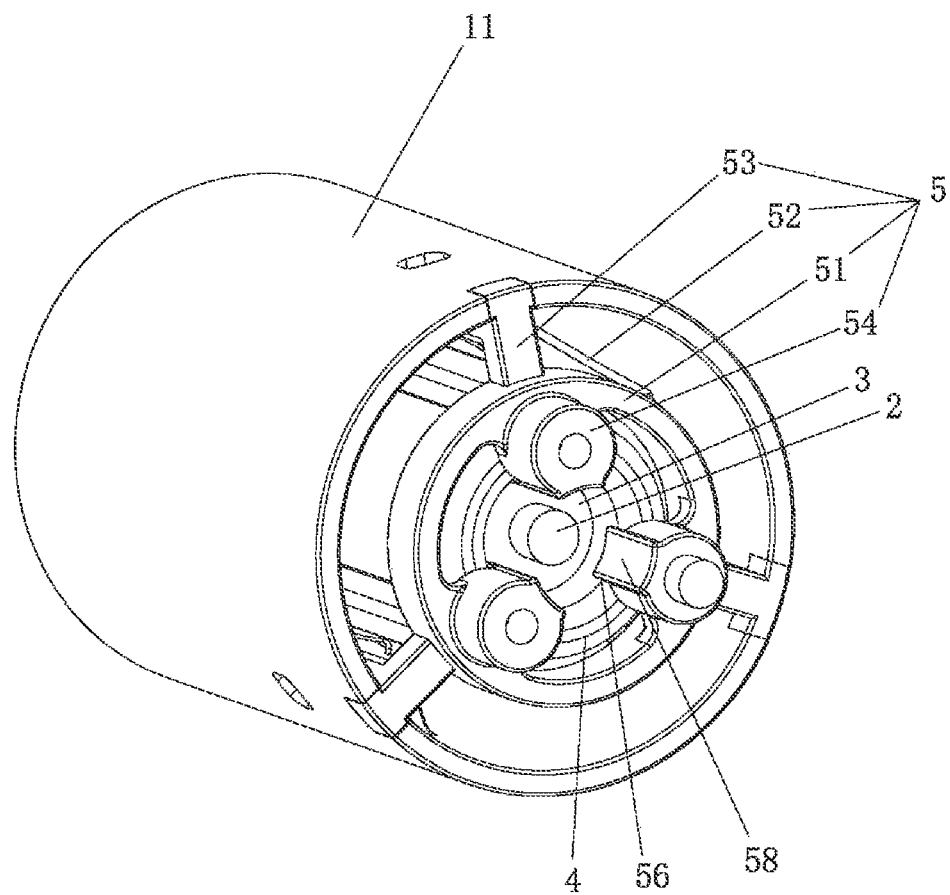
FIG. 2 is a schematic three-dimensional structural diagram of the motor according to the first embodiment of the present invention from another perspective.

1. Outer shell; 11. Sleeve; 111. Buckle hole; 112. Positioning slot; 113. Buckle block; 114. Positioning block; 12. Inner core; 13. Air guide plate; 14. Air guide duct; 15. Mounting hole; 16. bearing; 17. heat dissipation hole; 18, limit protrusion; 19, jack; 2, shaft; 3, magnetic ring; 4, three-phase hollow cup coil winding; 5, insulating end cover; 51, End ring; 52, collet; 53. snap claw; 54, limit block; 55, plug-in; 56, limit piece; 57, limit slot; 58, arc surface; 6, through hole; 61, convex Column; 7. Insulator; 71. Ring; 72. Positioning plate; 8. Positioning cavity; 81. Fan blade; 82. Arc tab; 83. Guide slope.

DETAILED DESCRIPTION

In order to facilitate the understanding of those skilled in the art, the present invention will be further described below with reference to the embodiments and the accompanying drawings, and the contents mentioned in the embodiments are not intended to limit the present invention.

Example 1

As shown in FIGS. 1 to 4 and 8, a motor provided by the present invention includes a casing 1, a rotating shaft 2, a magnetic ring 3, a three-phase hollow cup coil winding 4 and an insulating end cover 5. The casing 1 includes a sleeve 11, an inner core 12 disposed at the air inlet end of the sleeve 11 and coaxially arranged with the sleeve 11, and a plurality of air guide plates 13 connected between the inner wall of the sleeve 11 and the outer wall of the inner core 12. A plurality of air guide plates 13 are arranged in an annular array around the central axis of the inner core 12. The inner wall of the sleeve 11, the outer wall of the inner core 12 and the two adjacent air guide plates 13 are surrounded to form an air guide duct 14. A mounting hole 15 is recessed in the middle of the inner core 12, and a bearing 16 is installed in the mounting hole 15. The rotating shaft 2 is installed on the inner ring of the bearing 16 and penetrates the bearing 16. The magnetic ring 3 is sleeved on one end (tail end) of the rotating shaft 2. The magnetic ring 3 is located in the sleeve 11, the three-phase hollow cup coil winding 4 is sleeved outside the magnetic ring 3, a rotating gap is set between the inner wall of the three-phase hollow cup coil winding 4 and the outer wall of the magnetic ring 3, and the insulating end cover 5 removably installed on the air outlet end of the sleeve 11 and used to fix the three-phase hollow cup coil winding 4 in the sleeve 11, the inner core 12 is provided with a plurality of heat dissipation holes 17, and the plurality of heat dissipation holes 17 are arranged in an annular array, which is around the central axis of the inner core 12 and around the mounting hole 15. Each of the plurality of heat dissipation holes 17 communicates with the mounting hole 15. This embodiment is described by taking the fan blade 81 sleeved outside the other end (the head end) of the rotating shaft 2 as an example, that is, the fan blade 81 is located outside the inner core 12.

During actual operation, part of the airflow generated by the rotation of the fan blades 81 passes through the plurality of heat dissipation holes 17 and the mounting holes 15 to the internal components of the motor (such as the rotating shaft 2, the bearing 16, the magnetic ring 3 and the three-phase hollow cup coil winding 4, etc.) to dissipate heat, and another part of the airflow is blown out through the plurality of air guide ducts 14. During the process of blowing the airflow out of the sleeve 11, the airflow will not only directly blow out of the sleeve 11, but also diffuse into the rotation gap and blow out through the rotation gap, and further, it is beneficial to the heat dissipation of the magnetic ring 3 and the three-phase hollow cup coil winding 4, the heat dissipation effect is good, and the service life of the motor is prolonged, and the motor adopts a split structure, which is convenient for disassembly and maintenance of the motor; the inner wall of the mounting hole 15 of the bearing 16 is limited to ensure the stability of the bearing 16. The rotating shaft 2 runs through the two bearings 16, so that the two ends of the rotating shaft 2 are cantilevered, and the rotating shaft 2 is supported by the bearing 16, which can well ensure the rotating shaft 2. The concentricity with the inner core 12 and the sleeve 11 improves the stability and efficiency of the rotation of the rotating shaft 2. The present invention has the advantages of compact structure, good heat dissipation effect, convenient disassembly, assembly and maintenance, good expansibility, good concentricity between the rotating shaft 2 and the sleeve 11 and the inner core 12, stable rotation, small gas flow resistance, large air output, and a motor has high efficiency and long service life.

In this embodiment, the number of the mounting holes 15 is two, and the two mounting holes 15 are respectively concave from both ends of the inner core 12. Limiting protrusions 18 and two bearings 16 are respectively installed in the two mounting holes 15. The inner wall of the mounting hole 15 is in contact with the outer ring of the bearing 16, and the limiting protrusion 18 limits the bearing 16, which facilitates the installation of the bearing 16 and also improves the stability of the bearing 16 being mounted on the inner core 12; the rotating shaft 2 passes through the two bearings 16, and the two ends of the rotating shaft 2 are cantilevered, and the rotating shaft 2 is supported by two bearings 16, which can well ensure the concentricity of the rotating shaft 2 and the sleeve 11, and improve the rotation stability of the rotating shall 2.

In this embodiment, the insulating end cover 5 includes an end ring 51, a plurality of collets 52 connected to one end of the end ring 51, a plurality of snap claws 53 connected to the circumferential direction of the end ring 51, and a plurality of claws 53 connected to the end ring. A plurality of limit blocks 54 at the other end of the 51, a plurality of collets 52 are sleeved outside the three-phase hollow cup coil winding 4, a plurality of claws 53 are snap-connected with the sleeve 11, and the plurality of limit blocks 54 Both of them abut against the other end of the three-phase hollow cup coil winding 4, and the claws 53 are L-shaped.

The insulating end cover 5 and the housing 1 are detachably connected by snapping connection with the sleeve 11 through a plurality of snap claws 53, which facilitates the disassembly and maintenance of the insulating end cover 5 and the housing 1 without additional disassembling tools. The disassembly and assembly of the insulating end cover 5 and the housing 1 is realized, and the cost of disassembly and assembly and maintenance is reduced. The plurality of collets 52 are evenly sleeved on the outside of the three-phase hollow cup coil winding 4, and the plurality of collets 52 clamp the three-phase hollow cup coil winding 4, which is convenient to assemble and ensures the three-phase hollow cup coil winding 4. The three-phase hollow cup coil winding 4 installed in the collet 52 is also limited by a plurality of limit blocks 54, which improves the positional accuracy of the three-phase hollow cup coil winding 4 and further improves the three-phase hollow cup coil winding 4.

In this embodiment, the inner end surface of the inner core 12 is concavely provided with the insertion hole 19, and the end of the collet 52 away from the end ring 51 is provided with an insert 55 inserted into the insertion hole 19. When the insulating end cover 5 is snapped to the sleeve 11, the insert 55 is inserted into the insertion hole 19 of the inner core 12, and the insert 55 is guided and limited through the insertion hole 19, so that the collet 52 can be clamped stably on the three-phase hollow cup coil winding 4.

In order to further improve the stability of the three-phase hollow cup coil winding 4 in the insulating end cover 5, in the present embodiment, the inner side of the limit block 54 is protruded with a limit piece 56 arranged opposite to a collet 52 to limit the one side of the position piece 56, the limit block 54 and the collet 52 are surrounded by a limit slot 57, the other end of the three-phase hollow cup coil winding 4 is inserted into the limit slot 57, and the other end of the limit piece 56 is inserted into the limit slot 57. There is a space between one side and the outer side wall of the magnetic ring 3.

Specifically, in order to ensure a high air gap density, the rotation gap is 0.5 mm-0.8 mm. When the rotation gap is too small, the magnetic ring 3 and the three-phase hollow cup coil winding 4 are easily rubbed. When the rotation gap is too large, the air gap The density is low; a second bearing is installed between the limit pieces 56 of the plurality of limit blocks 54, and one end (tail end) of the rotating shaft 2 penetrates the magnetic ring 3 and then is inserted into the inner ring of the second bearing, and passes through the second bearing. Supporting one end of the rotating shaft 2 further improves the concentricity of the rotating shaft 2 and also improves the rotation efficiency of the rotating shaft 2.

Of course, the bearing 16 and the second bearing can be combined at will, and the number of the two can also be increased or decreased according to actual needs, for example: when the number of bearings 16 is two, the second bearing may not be installed; when the number of bearings 16 For one, a second bearing can be installed.

Specifically, the other side of the limiting piece 56 is provided with a circular arc surface 58 with the same arc as the outer side wall of the second bearing. To limit the position to ensure the stability of the second bearing.

In this embodiment, a snap hole 111 is provided in the middle of the sleeve 11, and a snap block 113 is provided at one end of the snap claw 53 away from the end ring 51 to snap into the snap hole 111; the sleeve of the air outlet end of the cylinder 11 is provided with a positioning groove 112, and one end of the locking claw 53 close to the end ring 51 is provided with a positioning block 114 inserted into the positioning groove 112. This structural design facilitates the disassembly and assembly of the insulating end cover 5 and the sleeve 11, and improves the stability and efficiency of the assembly of the insulating end cover 5 and the housing 1.

In this embodiment, the air guide plate 13 is in the shape of an involute arc. The air deflector 13 is in the shape of an involute arc surface, and the air deflector 13 in the shape of an involute arc surface guides the airflow, reduces the resistance of the airflow, thereby reduces the noise, and improves the air volume and air pressure generated by the fan.

Specifically, the buckle block 113 is provided with a guide slope 83. By adding the guide slope 83, it is convenient for the buckle block 113 to enter the buckle hole 111, thereby facilitating the disassembly and assembly of the insulating end cover 5.

Example 2

Figure 5:
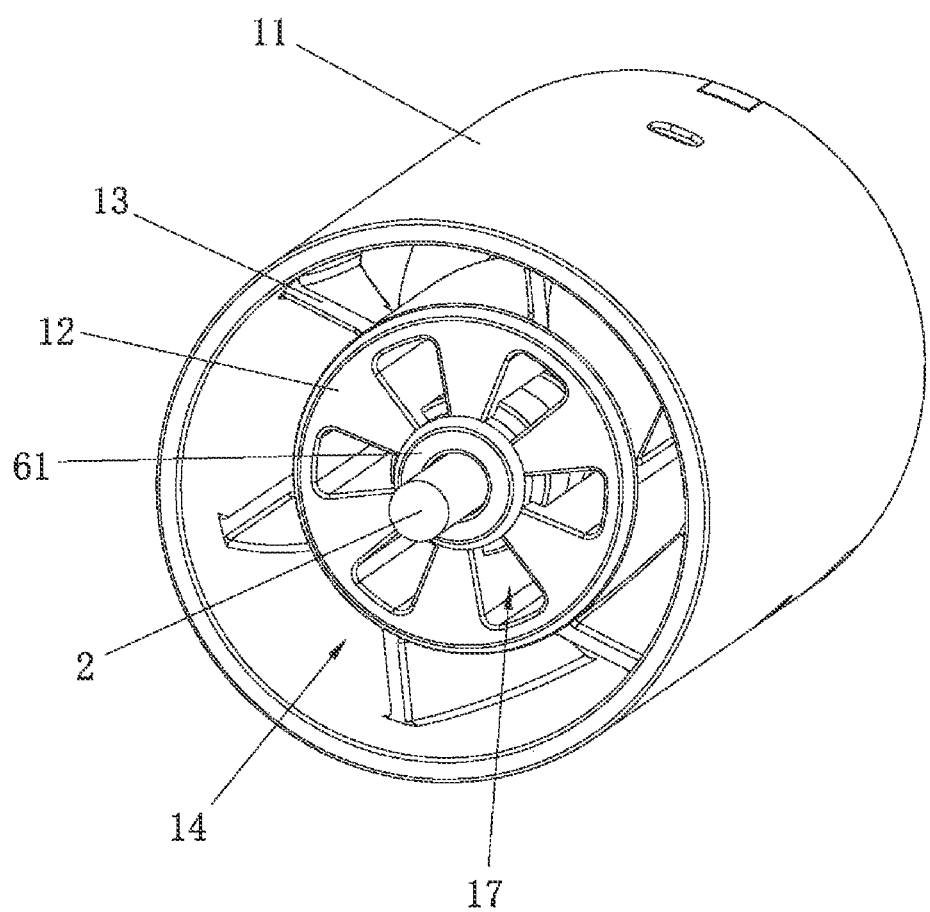
FIG. 5 is a schematic three-dimensional structure diagram of the motor according to the second embodiment of the present invention.
Figure 6:
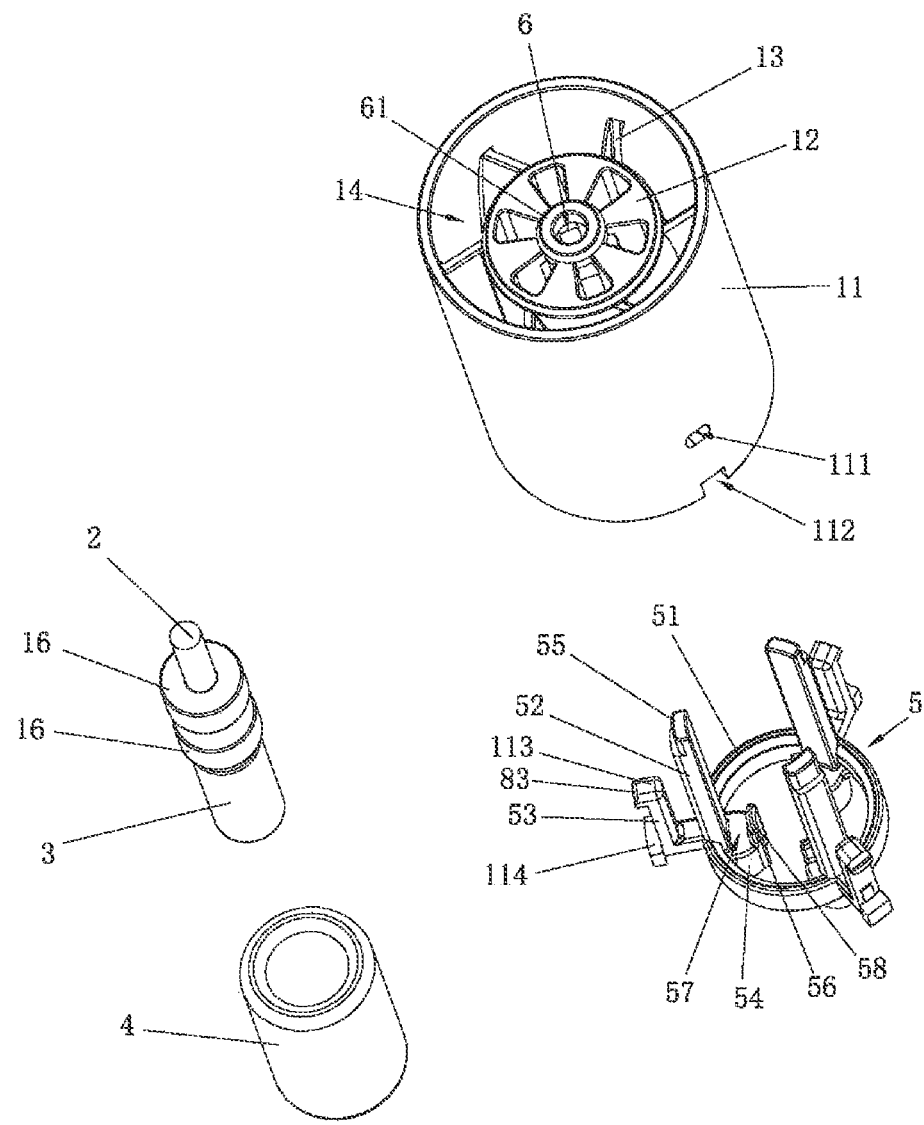
FIG. 6 is a schematic diagram of the exploded structure of the motor according to the second embodiment of the present invention.
Figure 7:
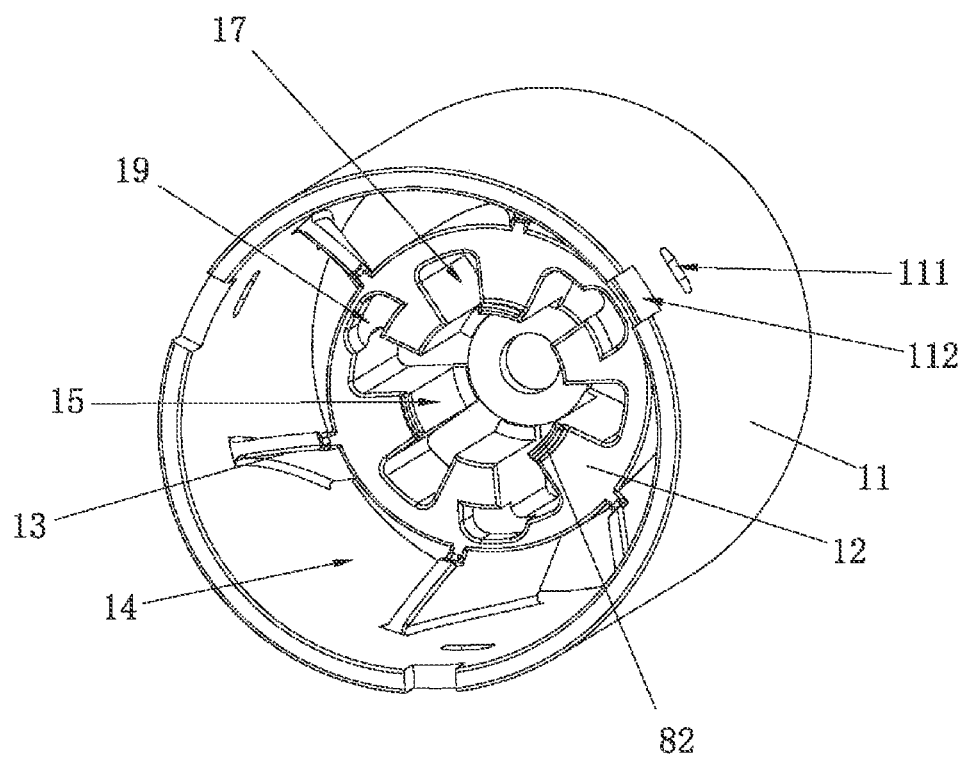
FIG. 7 is a schematic three-dimensional structure diagram of the shells of the second embodiment and the fourth embodiment of the present invention.
Figure 8:
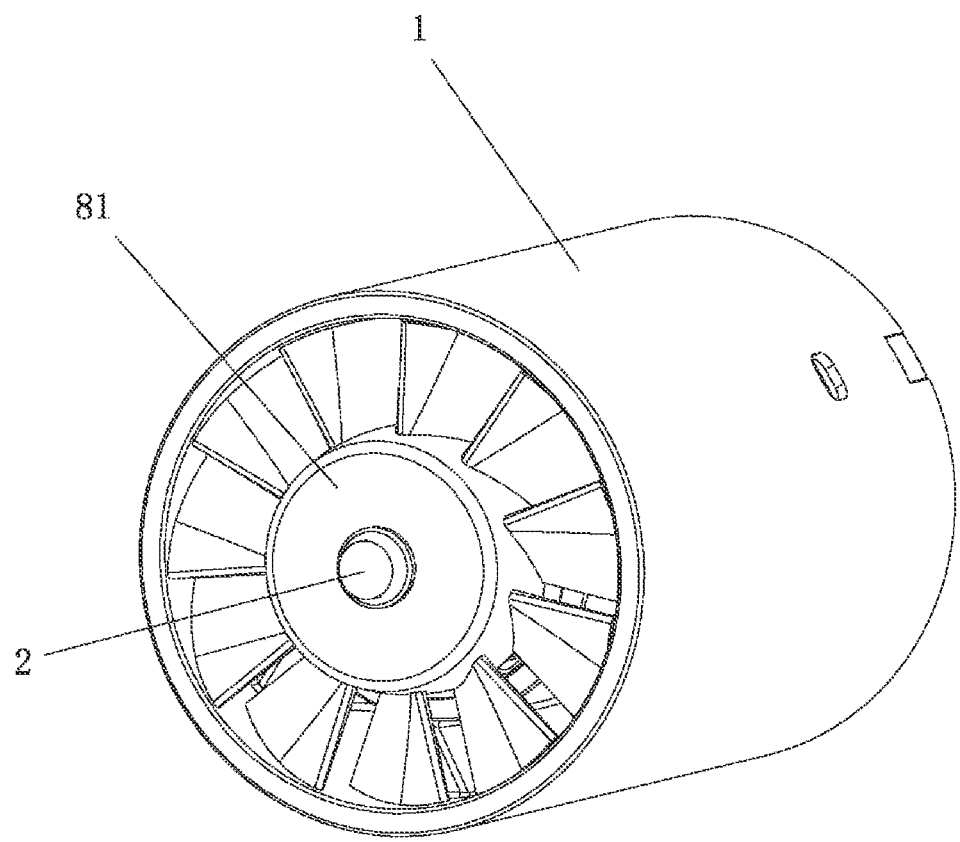
FIG. 8 is a schematic three-dimensional structure diagram of the split fan according to the fifth embodiment of the present invention.

As shown in FIG. 5 to FIG. 7, the difference between this embodiment and the first embodiment is that the mounting hole 15 is formed concavely from the inner side of the inner core 12 to the middle of the inner core 12. The side is provided with a through hole 6 that communicates with the mounting hole 15, the rotating shaft 2 penetrates the inner ring of the bearing 16 and the through hole 6, and the sum of the thicknesses of the two bearings 16 is not greater than the hole depth of the mounting hole 15, so that the bearing 16 is connected to the inner ring. The structure of the core 12 is compact, and the rotating shaft 2 passes through the two bearings 16 and the through hole 6, so that the two ends of the rotating shaft 2 are cantilevered, and the rotating shaft 2 is supported by the two bearings 16, and the rotating shaft 2 can be well ensured. The concentricity of the core 12 and the sleeve 11 improves the stability and efficiency of the rotation of the shaft 2. Specifically, the outer surface of the inner core 12 is provided with a convex column 61, the through hole 6 penetrates the convex column 61, and the convex column 61 is used to abut against the inner surface of the fan blade 81 to reduce the distance between the inner core 12 and the fan blade. The contact area of 81 is reduced, thereby reducing the frictional resistance received by the fan blade 81 when it rotates.

The rest of the structures of this embodiment are the same as those of the first embodiment, and the same structures are analyzed by the first embodiment, and are not repeated here.

Example 3

Figure 3:
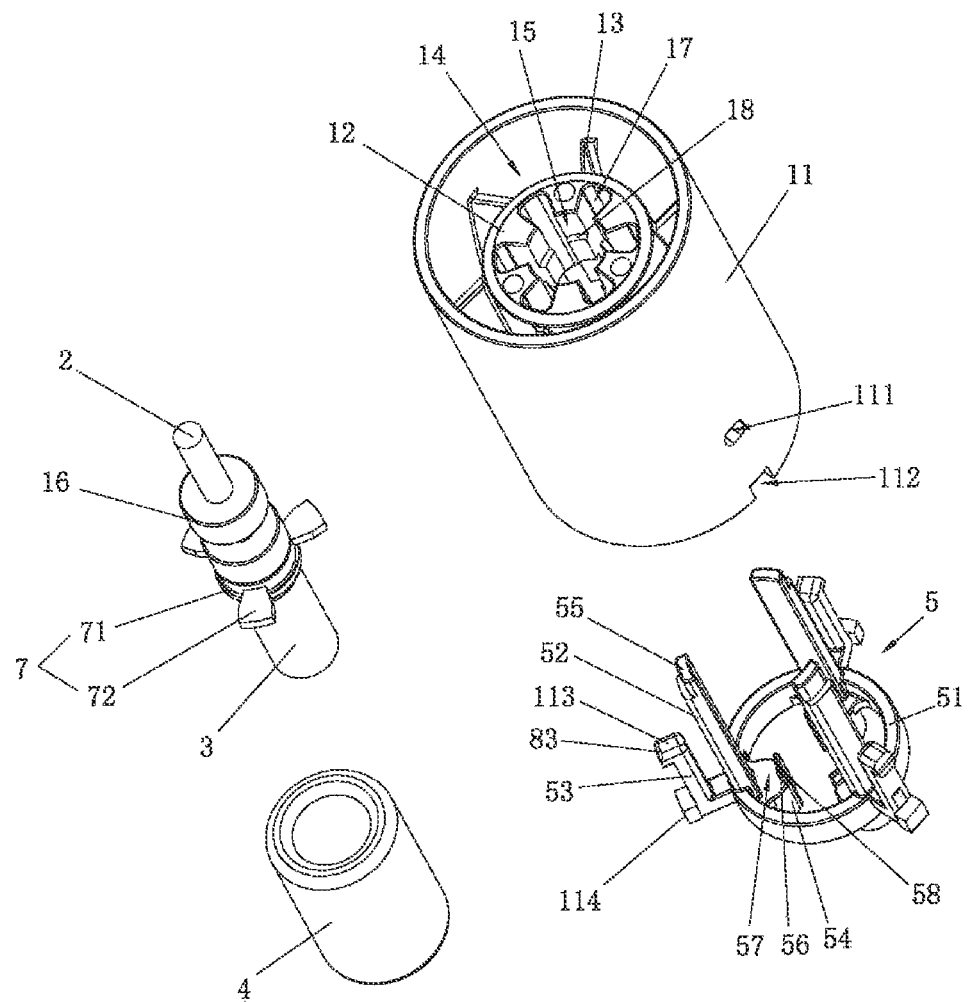
FIG. 3 is a schematic diagram of the exploded structure of the motors according to the first and third embodiments of the present invention.
Figure 4:
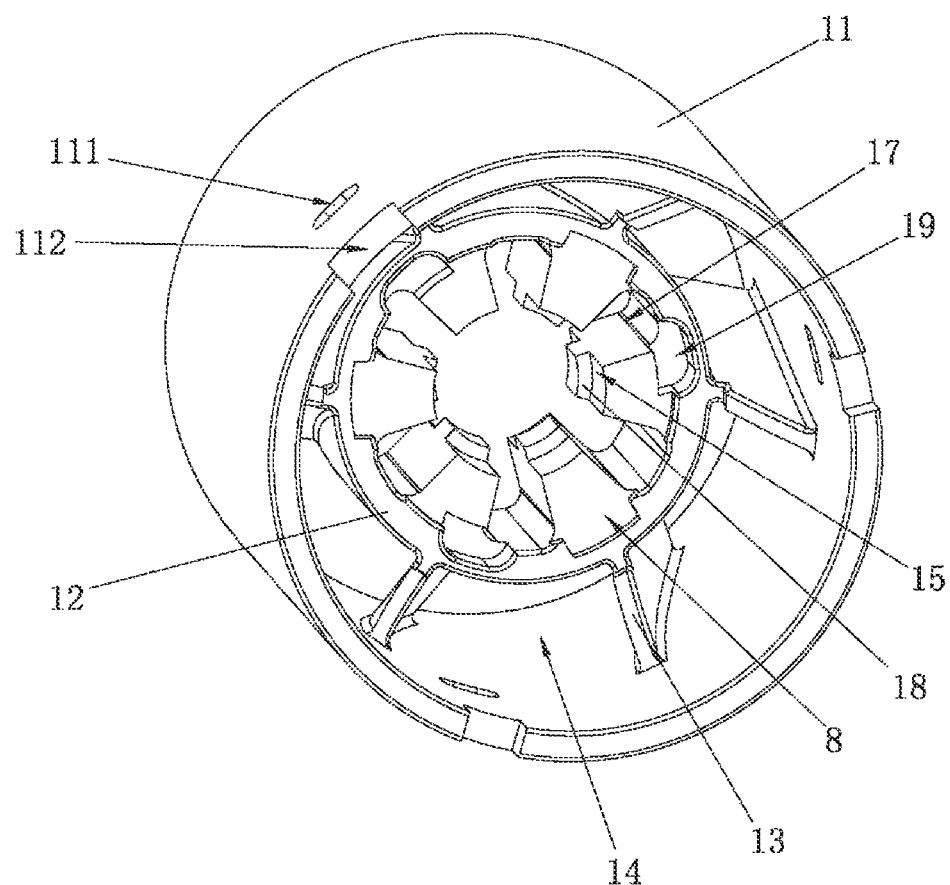
FIG. 4 is a schematic three-dimensional structure diagram of the housings according to the first and third embodiments of the present invention.

As shown in FIGS. 3 and 4, the difference between this embodiment and the first embodiment is that the casing 1 is a metal casing, specifically, the casing 1 is a zinc alloy casing or a zinc-aluminum alloy casing. The housing 1 has the characteristics of anti-electromagnetic interference to prevent the phenomenon of magnetic leakage.

In this embodiment, the motor further includes an insulating member 7 disposed between the inner wall of the three-phase hollow cup coil winding 4 and the outer wall of the magnetic ring 3. One end of the insulating member 7 touches one side of the inner core 12, and the other end of the insulating member 7 interferes with the three-phase hollow cup coil winding 4. The casing 1 and the three-phase hollow cup coil winding 4 are insulated by the insulating member 7 to prevent the problem of short circuit or electric leakage of the motor, and the safety performance is good, so that the motor can work normally.

In the present embodiment, the inner end surface of the inner core 12 is concavely provided with a positioning cavity 8 communicating with the mounting hole 15, and one end of the insulating member 7 is inserted into the positioning cavity 8. The positioning of the insulating member 7 through the positioning cavity 8 facilitates the installation of the insulating member 7 on the one hand, and ensures the stability of the insulating member 7 on the other hand.

In this embodiment, the insulating member 7 includes a collar 71 and a plurality of positioning plates 72 arranged in the circumferential direction of the collar 71. The plurality of positioning plates 72 are arranged in an annular array around the central axis of the collar 71. One end of the ring 71 is inserted into the mounting hole 15, one side of the plurality of positioning plates 72 is inserted into the positioning cavity 8, there is a gap between one end of the magnetic ring 3 and the other end of the collar 71, and the plurality of positioning plates of the other side of 72 is in contact with one end of the three-phase hollow cup coil winding 4. The insulating member 7 of this structural design not only facilitates the assembly of the inner core 12, the insulating member 7, the magnetic ring 3 and the three-phase hollow cup coil winding 4, but also makes the inner core 12, the insulating member 7, the magnetic ring 3 and the three-phase hollow cup coil easy to assemble. The structure between the windings 4 is compact, and the stability and positional accuracy of the insulating member 7, the magnetic ring 3 and the three-phase hollow cup coil winding 4 are improved, and the insulation effect is good.

The rest of the structures of this embodiment are the same as those of the first embodiment, and the same structures are analyzed by the first embodiment, and are not repeated here.

Example 4

As shown in FIG. 7, the difference between this embodiment and the first embodiment is that the casing 1 is a plastic casing. The plastic casing has light weight, good insulation, low manufacturing and use costs, and is easy to manufacture. When the casing 1 is a plastic casing, the use of the insulating member 7 can be selectively reduced, the parts of the motor are reduced, the motor is made more compact, and the manufacturing and use costs of the motor are reduced.

In this embodiment, the inner side of the inner core 12 is extended with a plurality of circular arc convex pieces 82, and the plurality of circular arc convex pieces 82 are arranged around the mounting hole 15 in an annular array around the central axis of the inner core 12. One end of the three-phase hollow cup coil winding 4 is sleeved outside the plurality of arc convex pieces 82. One end of the three-phase hollow cup coil winding 4 is sleeved outside the arc lug 82, which facilitates the assembly of the three-phase hollow cup coil winding 4, and improves the positional accuracy of the three-phase hollow cup coil winding 4 in the sleeve 11.

The rest of the structures of this embodiment are the same as those of the first embodiment, and the same structures are analyzed by the first embodiment, and are not repeated here.

Example 5

As shown in FIG. 1 to FIG. 8, this embodiment also provides a split fan, which includes a fan blade 81 and the above-mentioned motor. 81 is located in the air inlet end of the sleeve 11 and is arranged on the outer side of the inner core 12. The split-type fan has compact structure, good heat dissipation effect, convenient disassembly and maintenance, good expandability, uniform magnetic field distribution, good concentricity between rotating shaft 2 and sleeve 11 and inner core 12, stable rotation, and small airflow resistance. The air output is large, the air gap density is large, the fan efficiency is high, and the service life is long.

The rest of the structures of this embodiment are the same as those of the first embodiment, and this embodiment has all the beneficial effects of the first to fourth embodiments above, which will not be repeated here.

All the technical features in this embodiment can be freely combined according to actual needs.

The above-mentioned embodiments are the preferred implementation solutions of the present invention. In addition, the present invention can also be realized in other ways, and any obvious replacements are within the protection scope of the present invention without departing from the concept of the technical solution.

The invention claimed is:
1. A motor comprising:
a casing comprising:
   a sleeve, wherein a first end of the sleeve is defined as an air inlet end and a second end of the sleeve is defined as an air outlet end;
   an inner core arranged at the air inlet end and coaxial with the sleeve;
   a plurality of air guide plates connected between an inner wall of the sleeve and an outer wall of the inner core, the plurality of air guide plates are arranged in an annular array around a central axis of the inner core,
   an air guide channel surrounding the inner wall of the sleeve, the outer wall of the inner core and the two adjacent air guide plates;
   at least a first mounting hole recessed in the middle of the inner core;
   a first bearing installed in the first mounting hole;
   a plurality of heat dissipation holes arranged in an annular array around the central axis of the inner core and the first mounting hole, the plurality of heat dissipation holes communicating with the first mounting hole;

a rotating shaft installed on an inner ring of the first bearing and penetrating the first bearing;

a magnetic ring sleeved on one end of the rotating shaft, wherein the magnetic ring is located in the sleeve, a three-phase hollow cup coil winding sleeved outside the magnetic ring;

a rotating gap between an inner wall of the three-phase hollow cup coil winding and an outer wall of the magnetic ring; and an insulating end cover detachably installed at the air outlet end of the sleeve and used to fix the three-phase hollow cup coil winding in the sleeve.

2. The motor as claimed in claim 1, further comprising a second mounting hole, and the first mounting hole and the second mounting hole are respectively formed by concave inwards from both ends of the inner core, and a limit protrusion for abutting the first bearing is arranged between the first mounting hole and the second mounting hole.

3. A split-type fan comprising the motor as claimed in claim 2 and a fan blade sleeved on one end of the rotating shaft of the motor away from the magnetic ring, wherein the fan blade is located in the air inlet end of the sleeve, and is arranged on the outside of the inner core.

4. The motor as claimed in claim 1, wherein the casing is a metal casing or a plastic casing.

5. A split-type fan, comprising the motor as claimed in claim 4 and a fan blade sleeved on one end of the rotating shaft of the motor away from the magnetic ring, wherein the fan blade is located in the air inlet end of the sleeve, and is arranged on the outside of the inner core.

6. The motor as claimed in claim 1, wherein the insulating end cover includes an end ring, a plurality of collets connected to one end of the end ring, a plurality of snap claws connected and arranged around of the end ring, and a plurality of limit blocks connected to the other end of the end ring, wherein each collet is sleeved on the outside of the three-phase hollow cup coil winding, the plurality of snap claws are connected with the sleeve, and the plurality of limit blocks are against one end of the three-phase hollow cup coil winding.

7. The motor as claimed in claim 6, wherein an inner wall of the inner core is recessed to form an insertion hole, and each collet comprises a plug inserted in the insertion hole at an end of the collet away from the end ring.

8. A split-type fan comprising the motor as claimed in claim 7 and a fan blade sleeved on one end of the rotating shaft of the motor away from the magnetic ring, wherein the fan blade is located in the air inlet end of the sleeve, and is arranged on the outside of the inner core.

9. The motor as claimed in claim 6, wherein each limit block has a limit piece protruding from an inner side of the limit block, and arranged opposite to one of the plurality of collets; and wherein a limit slot is defined at least by one side of the limit piece;

wherein one end of the three-phase hollow cup coil winding is inserted in the limit slot, and space is formed between an outer side of the limit piece and the outer wall of the magnetic ring.

10. The motor as claimed in claim 9, wherein a second bearing is arranged between the limit pieces of the plurality of limit blocks, and one end of the rotating shaft penetrates the magnetic ring and is inserted into the second bearing.

11. The motor as claimed in claim 6, wherein the middle part of the sleeve is recessed to form a snap hole, and one end of the snap claw away from the end ring comprises a snap block which snaps into the snap hole.

12. The motor as claimed in claim 6, wherein the air outlet end of the sleeve comprises a positioning groove, and one end of the claws close to the end ring comprises a positioning block inserted in the positioning groove.

13. A split-type fan comprising the motor as claimed in claim 6 and a fan blade sleeved on one end of the rotating shaft of the motor away from the magnetic ring, wherein the fan blade is located in the air inlet end of the sleeve, and is arranged on the outside of the inner core.

14. The motor as claimed in claim 1, further comprising a plurality of arc convex pieces extending from an inner side of the inner core, and the plurality of circular arc convex pieces are arranged around the first mounting hole in a circular array around the central axis of the inner core, and one end of the three-phase hollow cup coil winding is sleeved on the plurality of arc convex pieces.

15. A split-type fan comprising the motor as claimed in claim 1 and a fan blade sleeved on one end of the rotating shaft of the motor away from the magnetic ring, wherein the fan blade is located in the air inlet end of the sleeve, and is arranged on the outside of the inner core.

16. The motor as claimed in claim 1, wherein the plurality of air guide plates are in the shape of an involute arc.

17. A split-type fan comprising the motor as claimed in claim 16 and a fan blade sleeved on one end of the rotating shaft of the motor away from the magnetic ring, wherein the fan blade is located in the air inlet end of the sleeve, and is arranged on the outside of the inner core.

18. A split-type fan comprising the motor as claimed in claim 14 and a fan blade sleeved on one end of the rotating shaft of the motor away from the magnetic ring, wherein the fan blade is located in the air inlet end of the sleeve, and is arranged on the outside of the inner core.

* * * * *